No. 715,232. Patented Dec. 2, 1902.
G. W. WORLEY.
STACKER.
(Application filed Feb. 6, 1902.)
(No Model.) 2 Sheets—Sheet 1.

WITNESSES:
INVENTOR
George W. Worley
BY
ATTORNEYS

No. 715,232. Patented Dec. 2, 1902.
G. W. WORLEY.
STACKER.
(Application filed Feb. 6, 1902.)

(No Model.) 2 Sheets—Sheet 2.

WITNESSES:

INVENTOR
George W. Worley
BY
ATTORNEYS

THE NORRIS PETERS CO., PHOTO-LITHO., WASHINGTON, D. C.

UNITED STATES PATENT OFFICE.

GEORGE WASHINGTON WORLEY, OF GOLDFIELD, IOWA.

STACKER.

SPECIFICATION forming part of Letters Patent No. 715,232, dated December 2, 1902.

Application filed February 6, 1902. Serial No. 92,773. (No model.)

*To all whom it may concern:*

Be it known that I, GEORGE WASHINGTON WORLEY, a citizen of the United States, and a resident of Goldfield, in the county of Wright and State of Iowa, have invented a new and Improved Stacker, of which the following is a full, clear, and exact description.

This invention relates to a mechanism for carrying off the straw and chaff from threshing-machines and stacking the same at any desired adjacent point.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1:
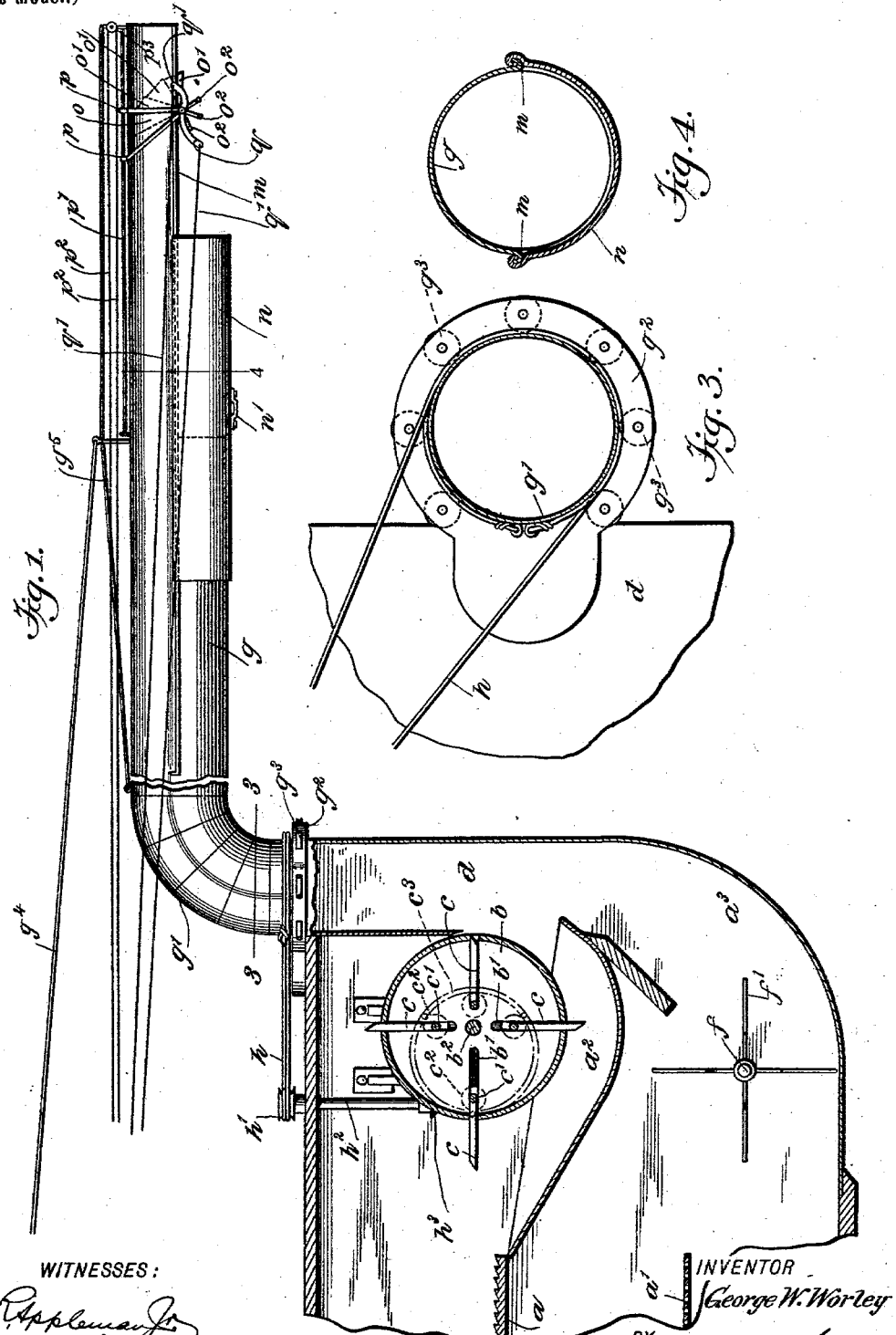
Figure 2:
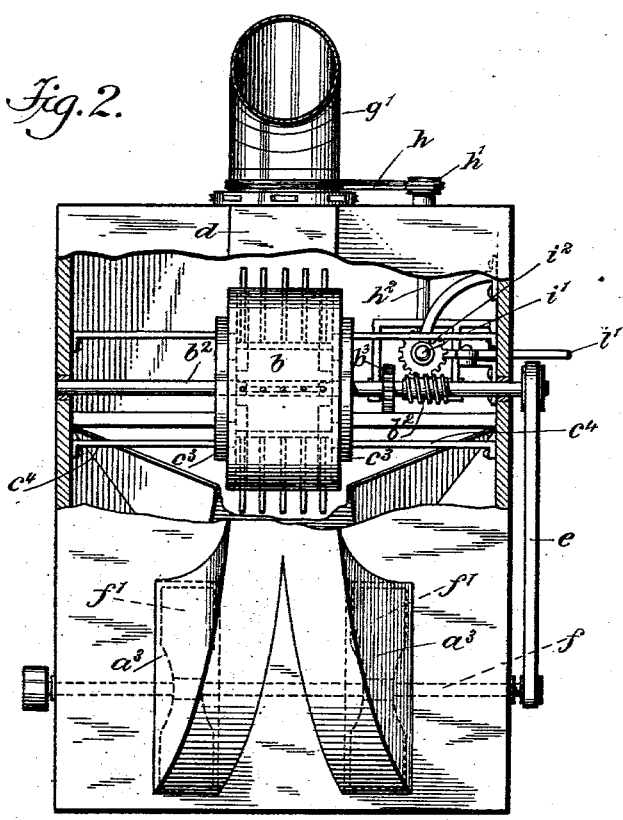
Figure 5:
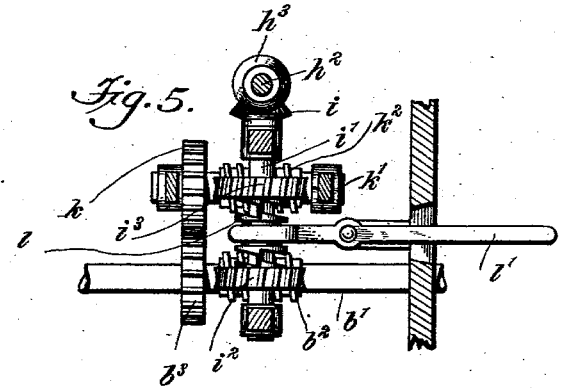

Figure 1 is a sectional side elevation of the invention. Fig. 2 is a rear elevation with parts broken away. Fig. 3 is a sectional plan view thereof on the line 3 3 of Fig. 1. Fig. 4 is a section on the line 4 4 of Fig. 1, and Fig. 5 is a detail view of gearing for swinging the chute.

$a$ represents the straw-rack of the harvester, and $a'$ the sieve over which the chaff and grain are passed to separate them from each other. The straw-rack $a$ terminates in a pan $a^2$, which is tapered toward the rear end and over which is arranged the drum $b$, which carries a number of radially-disposed rakes $c$, arranged to move into and out of the drum as the drum turns. These rakes are carried in gangs by bars $c'$ within the drum and sliding in radial slots $b'$ in the heads of the drum. The bars $c'$ extend parallel with the axis of the drum and project outside thereof, carrying rollers $c^2$ at their ends.

$c^3$ indicates rings eccentric to the axis of the drum and held rigidly by arms $c^4$. These rings are engaged by the rollers $c^2$, and by the joint action of the rings $c^3$ and the centrifugal force of the drum the rakes are caused to move in and out of the drum as the same revolves. The rakes serve to gather the straw as it passes from the rack and to carry it over the pan $a^2$ and upward into the passage $d$.

The drum $b$ is mounted on a shaft $b^2$ and is driven by a belt $e$, which connects it with a drive-shaft $f$. The drive-shaft carries two fans $f'$, which are arranged, respectively, in boxes $a^3$, formed on the casing of the harvester, at the rear thereof. These boxes $a^3$ converge into each other, and the passage $d$ forms a continuation of the fan-boxes. The fan-boxes draw in the chaff from the sieve $a'$ and discharge it into the passage $d$, and the blast passing through the chute carries the straw from the drum $b$, said drum acting continuously to feed the straw into the passage.

$g$ represents the straw-chute, which is tubular in form and connected with an elbow $g'$, that is mounted at the top of the passage $d$ to receive the straw therefrom. This elbow is held to turn in a collar $g^2$, fastened on the harvester at the top thereof and provided with a number of antifriction-sheaves $g^3$, bearing against the collar to allow it to turn easily. Wound around the base of the elbow $g'$ is a cord or wire $h$, which is also wound around a small sheave $h'$, fastened on a vertical shaft $h^2$, mounted in the casing of the harvester. This shaft $h^2$ is provided at its lower end with a bevel-gear $h^3$, in mesh with a corresponding gear $i$ on a shaft $i'$ within the harvester alongside the drum $b$, but passing transversely to the axis thereof—that is to say, the shaft $b'$. The shaft $b'$ carries a worm $b^2$, and this is in mesh with a worm-wheel $i^2$ on the shaft $i'$. The shaft $b'$ also carries a spur-wheel $b^3$, in mesh with a spur-wheel $k$ on a shaft $k'$, passing across the shaft $i'$ parallel with the shaft $b$. The shaft $k'$ carries a worm $k^2$, in mesh with a worm-wheel $i^3$ on the shaft $i'$. The worm-wheels $i^2$ and $i^3$ are loose on the shaft $i'$ and have clutch-faces formed on the sides adjacent to each other. With these clutch-faces works a clutch $l$, splined on the shaft $i'$ and connected with a lever $l'$, so as to be moved from one position to the other. By means of this gearing the shaft $i'$ may be driven from the shaft $b'$ in either direction, and thus the shaft $h^2$, with the elements $h'$ and $h$, may be driven in either direction, as desired. This will swing the chute $g$ so as to deliver the straw and chaff in the position desired. The chute $g$ is sustained in horizontal adjustment, as shown, by means of a connection $g^4$, passing to the chute from a suitable device for supporting the latter. This connection $g^4$, which may be a wire or a rope, passes to a truss $g^5$ on the chute, as illustrated. The under side of the chute at its discharge end is cut away, as indicated at m, to give the chute the cross-sectional form best shown in Fig. 4.

Arranged to slide on the chute g, at the cut-away point thereof, is a chute-section n, which is semicircular in cross-section and which may be moved outward to fill the portion cut away at m. This sliding section n may be moved outward or inward, as desired, so that the chute may be continued unbroken to the front extremity thereof, or by moving the section n inward the chute may be allowed to dump the straw at any point desired. The section n has a strap n' fastened thereto to facilitate its adjustment, and this adjustment may be made either manually or by any desired device provided for this purpose. This sliding section n works with a collapsible hood, which when in operative position causes the straw to drop from the desired point on the chute. The hood comprises a rigid circular segmental section o and several folding circular segmental sections o', these folding sections having interengaging edges to prevent them from moving out beyond the position shown. Connected with the sections o' of the hood are tailpieces $o^2$, which strike one another in the closing operation, so as to move the sections o and o' together. The several sections of the hood may fold into each other, with the section o lying outside of all.

p indicates a frame to which the section o is rigidly fastened and to which the sections o' are pivoted. This frame is located outside the chute and is held to slide on a frame p', carried on top of the chute g.

$p^2$ indicates a rope passed around a sheave $p^3$, whereby to slide the frame and bodily move the hood.

q indicates a lever fulcrumed at its middle coincident with the axis of the pivots of the hood-sections o' and fastened to said pivots. This lever is adapted to be thrown to open or close the hood by ropes q', connected with its ends.

By drawing inward the section n and adjusting the hood in open position near the outer end of said section the straw may be dropped short of the outer end of the chute. By folding the hood together and running out the section n the straw may be carried to the very end of the chute.

The operation of the invention is as follows: The drum b, turning rapidly and working with the rings $c^3$, throws the rakes c outward over the pan $a^2$ and causes them to move over the same to draw the straw from the pan and force it into the passage d. The blast from the fans f' passes from the boxes $a^3$, drawing with it the chaff. All of this matter is thus forced out through the passage d into and through the chute. The straw and chaff may be dumped at any place desired by swinging the chute and adjusting the sliding section n and hood o.

Various changes in the form, proportions, and minor details of my invention may be resorted to without departing from the spirit and scope of my invention. Hence I consider myself entitled to all such variations as may lie within the scope of my claims.

Having thus described my invention, I claim as new and desire to secure by Letters Patent—

1. In a stacker, the combination of a revoluble drum, and a rake mounted thereon to move in and out thereof, said rake being thrown outward by centrifugal force.

2. In a stacker, the combination of a revoluble drum, a rake mounted thereon to move in and out thereof, said rake being thrown outward by centrifugal force, and a guide-ring held relatively stationary, to control the outward movement of the rake.

3. In a stacker, the combination of a revoluble drum, a rake mounted thereon to move in and out thereof, said rake being thrown outward by centrifugal force, and a guide-ring held relatively stationary, to control the outward movement of the rake, the said guide-ring being eccentric to the axis of the drum.

4. In a stacker, the combination of a revoluble drum, a rake mounted thereon to move in and out thereof, said rake being thrown outward by centrifugal force, a guide-ring held relatively stationary, to control the outward movement of the rake, the said guide-ring being eccentric to the axis of the drum, and a pan juxtaposed to the drum and coacting with the rakes.

5. In a stacker, the combination of a rotary carrying member, a rake carried by the same to move radially thereof under the action of centrifugal force, and means for limiting the outward movement of the rake.

6. The combination of walls forming a passage, means for creating a blast in the passage, a feed device for feeding the straw to the passage, a chute arranged to turn, the chute receiving the material from the passage, gearing connected with the feeding device and extending to the chute, whereby to turn the same, and clutch mechanism for throwing said gear in and out of action.

7. A straw-stacker having a chute, a section sliding thereon, a hood adjustably carried on the chute and coacting with said sliding section, for the purpose specified, a frame to which the hood is fastened, and a guide device in the chute, on which guide device the frame is adjustably carried.

8. A stacker having a chute, a portion of the bottom side of which is cut away, a chute part mounted to slide on the chute to cover or uncover the cut-away portion, a guide device on the main portion of the chute, a frame mounted to slide on said guide device, a hood carried on the frame and coacting with the sliding chute-section, and means for adjusting the frame.

9. A straw-stacker, comprising a chute, a guide device on the chute, a frame mounted to slide on the guide device, a folding hood coacting with the chute, said hood being mounted on the frame and comprising a number of circular segmental sections pivotally connected together, tailpieces attached to said sections, said tailpieces being adapted to engage the one against the other, to fold the hood, and means for moving the tailpieces.

10. A stacker, comprising the combination of a rotary carrier, a rake carried thereby, said carrier having a radial guide in which the rake is movable toward and from the center of the carrier, and a band juxtaposed to said rotary carrier and engaged by the rake, for the purpose specified.

11. A stacker having a chute, a portion of which at the bottom side is cut away, a chute part arc-shaped in cross-section and mounted to slide on the chute to cover or uncover said cut-away portion, a hood formed of independently-movable sections, said hood being thereby capable of folding and unfolding, and means on the main part of the chute for adjustably mounting the said hood in the cut-away portion of the chute.

In testimony whereof I have signed my name to this specification in the presence of two subscribing witnesses.

GEORGE WASHINGTON WORLEY.

Witnesses:
   JAMES H. HAYES,
   JAMES L. SHEARER.